United States Patent
Vayssiere

[11] 3,820,510
[45] June 28, 1974

[54] METHOD AND APPARATUS FOR TREATMENT OF GASES

[75] Inventor: Pierre Vayssiere, Metz, France

[73] Assignee: Institut De Recherches De La Siderugie Francaise (IRSID), Saint-Germain-en-Laye, France

[22] Filed: Dec. 26, 1972

[21] Appl. No.: 317,939

[30] Foreign Application Priority Data
Jan. 4, 1972   France .................................. 72.119

[52] U.S. Cl. .............................. 122/7 R, 110/119
[51] Int. Cl. ............................................ F22b 1/18
[58] Field of Search ............ 122/7 R, 7 A; 110/119; 165/105

[56] References Cited
UNITED STATES PATENTS

| | | | |
|---|---|---|---|
| 3,224,841 | 12/1965 | Kemmetmuller | 122/7 X |
| 3,428,117 | 2/1969 | Woodhead | 122/7 R |
| 3,580,718 | 5/1971 | Rasworschegg et al. | 122/7 X |
| 3,655,361 | 4/1972 | Brown et al. | 122/7 X |

Primary Examiner—Kenneth W. Sprague

[57] ABSTRACT

A method and apparatus for treatment of gases from an oxygen steel plant in which the gases derived from the refining plant are collected without combustion, and are then burned in the presence of a corresponding stoichiometric amount of gas from auxiliary pollution sources. The resultant burned gases are cooled with other gases from polluting sources, part of the recovered heat being reused, and the cooled gases are then subjected to a dust removal treatment and discharged.

8 Claims, 1 Drawing Figure

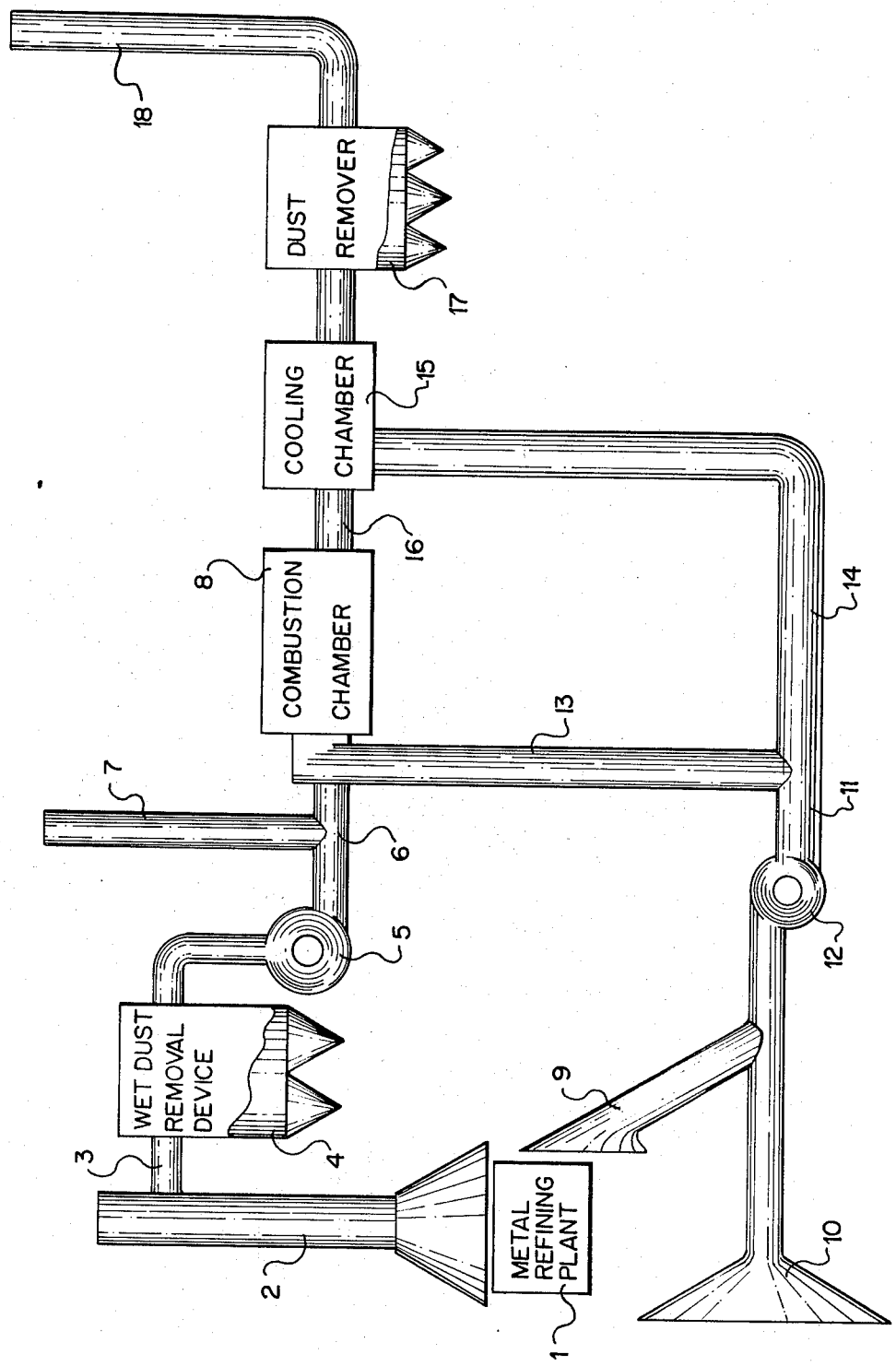

METHOD AND APPARATUS FOR TREATMENT OF GASES

This invention relates to a method and apparatus for treating a current of hot gases formed continuously or intermittently by an oxygen refining plant during the production of steel. These gases are cooled and the contaminating particles they are carrying are removed from these gases while improving the thermal efficiency of the refining plant by burning these gases and recovering the heat energy produced by this combustion. The present invention also involves simultaneously treating the various streams of contaminated gas emitted by the various sections of an oxygen steel plant apart from the actual refining installation.

Oxygen steel plants utilize steel manufacturing methods which involve the continuous or intermittent evolution of gases at very high temperatures and entraining considerable amounts of contaminating particles in the form of finely divided dust. It is vital to subject these gases to treatment to prevent pollution of the surrounding atmosphere.

This treatment usually comprises the disposition of various types of air filters or dust-removers downstream from a gas-collecting hood so as to separate the dust from the gas stream. The increasingly strict regulations on pollution involve the necessity of using high efficiency air filters. These filters, for example electrostatic air filters or filter bags, operate at relatively low temperatures compared with the temperatures of emission during refining. The gases must therefore be consideraby cooled before being introduced into these types of air filters. The dust-removal plants therefore include cooling devices, for example, using trickling water, generally associated with a first dust-removal stage called the wet stage. The cooling device may also be associated with a heat exchanger enabling the sensible heat of the gas to be transferred to a medium requiring heating, for example, the water in a boiler.

It has also been proposed to take advantage of the relatively high calorific value of the gases emitted in certain collectng conditons by using them directly as fuel in a boiler or furnace. In the case of intermittent emission of gas, produced by a treatment plant of the cyclic type, these operations involve the use of gas reservoirs to ensure a certain continuity of operation of the recovery devices. The cost of removing dust from the gas are thus partially offset.

However, the treatment of gases produced by a refining plant is not in itself sufficient to protect the atmosphere from pollution caused by the subsidiary emissions which necessarily arise in a steel plant in the course of the various steel treating operations. Thus, apart from the main emission caused by the actual refining operation, one must bear in mind the subsidiary sources of pollution necessitating supplementary dust-removal installations. Among these subsidiary sources can be included the air polluted in the immediate vicinity of the refining plant arising from parasitic discharges, and the polluted air derived from various auxiliary stations where pouring and treatment occurs, either of the molten metal before refining or of the steel after refining. These auxiliary operations involve the use of various secondary devices for collecting polluted atmosphere to be treated in independent dust-removal installations.

The expenditure on equipment for the effective protection of the atmosphere for all of the polluting operations in a steel-works is very high, both in respect of capital costs and for subsequent operating costs. Optimum functioning of all the dust-removal operations in an oxygen steel plant is made difficult by the diversity of pollution sources in time and space. For all these reasons the problem of pollution caused by oxygen steel plants has only been partly and only imperfectly solved in practice.

The object of the present invention is to provide an integrated solution to the problems of dust-removal in oxygen steel plants while permitting optimum functioning of all the various dust-removal operations and reducing the total amount of polluted gas to be treated.

In order to achieve this object, the invention provides a method for treating and purifying the streams of polluted gas from an oxygen steel plant, in which the main stream of gas emitted by the refining plant is collected without combustion while the other streams of gas produced by auxiliary pollution sources in the steel plant are collected at the same time. The main stream is burned in the presence of the corresponding stoichiometric amount of gas originating from the auxiliary pollution sources, part of the sensible heat from the burned gases being transferred to a medium needing heating. The cooling of the burned gases is completed by direct contact with the residue of gases originating from said auxiliary sources, and the said residue and the said cooled gases are then subjected to dust-removal treatment before being discharged into the atmosphere.

The invention also provides an apparatus for the practice of the preceding method, and comprises means for collecting, without combustion, a main gas stream emitted by a refining plant, and collecting means for secondary gas streams produced by auxiliary pollution sources in the steel plant. The flow of the main and secondary gas streams is accelerated by blowers. The apparatus comprises a combustion chamber with fuel feeding means consisting of a collector for the main gas stream. Combustion gas feeding means are provided comprising a first branch of a secondary gas stream collector, together with means for transferring part of the sensible heat of the gases burned in said combustion chamber to a medium requiring heating. A second branch of said collector is connected to a cooling chamber for the burned gases emitted from the combustion chamber, and there is also provided a dust-remover communicating with said cooling chamber and connected to a stack discharging the gases into the atmosphere.

It will be apparent that an oxygen steel plant having an integrated dust-removal system for the application of the method of the invention provides effective protection of the environment while substantially limiting the capital costs involved and the subsequent operating costs.

In practice, an oxygen steel plant including such a system only needs a single dust-removal station for treating a volume of gas less than the total volume collected, the difference arising from the fact that part of the gas taken in by the subsidiary collectors in the steel plant is used for the combustion of the gas emitted by the refining plant. The dust-removal station is thus designed for a quantity of treated gas less than the sum of the separate quantities in the dust-removal plants in a conventional system. Also, the cooling of the gases burned in the combustion chamber before they are fed into the central dust-remover is effected under very favorable heat exchange conditions. The gases burned in the combustion chamber can transfer their sensible heat in a very effective manner since they are at high temperature; on emergence from the combustion chamber, their mixture with the residue of cold gases coming from the auxiliary collectors allows sufficient supplementary cooling for the thermal protection of the dust-removers, without also necessitating the provision of external cooling means.

The said two cooling stages thus enable the cooling to be effected in heat exchange conditions which ensure a high total output. A further advantage lies in the fact that the cooling gases fed into the cooling chamber enable the humidity of the gases to be improved before their introduction into the central dust-remover. Finally, the integrated design of the system permits the application of known methods of optimizing the operation as, for instance, the graph method, so that the various components of the dust-removal system and their feed, output and loss of head can be determined to provide minimum operating costs and optimum functioning. This design enables the determination of the location of the actual sections of the steel plant per se.

Although the present dust-removal system may be applied to oxygen steel plants of a conventional type, i.e., including cyclically operating refining devices, its application to an oxygen steel plant utilizing continuous refining equipment enables all the advantages of the present system to be completely used since this permits a completely stable operation of the combustion chamber, and this appreciably simplifies the design of the system and facilitates the control thereof.

Further features and advantages will appear from the following description which is given by way of example only and with reference to the single attached drawing which represents a lay-out illustrating the method and apparatus according to the present invention.

Referring now to the drawing, an oxygen refining plant 1, which may be a conventional converter provided with an oxygen lance for the application of the basic oxygen refining method, or a continous refining reactor, is surmounted by a collector hood 2. It is noted that during an oxygen refining operation of a conventional type operating on a batch basis, the oxygen is blown in for a total of 15–30 minutes. During this period the converter outlet emits a stream of hot gas produced essentially by the carbon burned in the converter. The gas collected is more or less rich in carbon monoxide depending on whether or not air inlets are permissible. In the present case, it is imperative that the converter be provided with a non-combustion collector, i.e., preventing air inputs or limiting them to a very low value so as to provide a stream of collected fuel gas that is very rich in carbon monoxide.

The stream of collected gas is at a high temperature i.e., in the order of 1,350° to 1,650°C, and carries substantial amounts of fumes and particles of metal oxides. The hood 2 is connected by a conduit 3 to a wet dust-removal device 4 of a known type enabling the largest particles to be removed from the gas stream. The gas stream is then drawn to the outlet of said dust-remover 4 by a fan 5 and forced into a collector 6. The collector has a safety column 7 which is normally closed, while enabling gas to be directly discharged into the atmosphere in the case of an explosion in the collector. The collector 6 terminates in a combustion chamber 8. The chamber 8 can be a boiler or furnace, and the operation of this chamber will be explained below. Reference 9 indicates an auxiliary atmosphere collecting hood adjacent the refining plant, and 10 represents a collector hood representing the various intakes of polluted atmosphere in the vicinity of the various sections of the steel plant. The hoods 9 and 10 are connected to a collector 11 having a high pressure fan 12 for accelerating the collected gas stream. It will be noted that in origin this gas stream consists in essence of cold air carrying fumes and polluting particles emitted by the various operations of pouring or treating molten metal in the steel plant, apart from the actual refining operations. On leaving the high pressure fan, the collector 11 is divided into two branches 13 and 14. Branch 13 enters the combustion chamber 8 near the inlet into said chamber of the gas collector 6, and preferably, concentrically therewith. Branch 14 enters a cooling chamber 15. The upstream side of chamber 15 is connected by way of a conduit 16 to the combustion chamber 8, and the downstream side of the chamber 15 is connected to a central dust-remover 17. The dust-remover 17 is preferably one of a high efficiency type, for instance, an electrostatic dust-remover including dry or wet electrofilters, or one with filter bags. The output of the central dust remover is connected to the atmosphere by way of an outlet stack 18.

Two examples of operation of the equipment described above will now be given, the first relating to a conventional oxygen steel plant with a cyclically operating refining plant, such as is described, for instance, in Applicants' French Patent 1407082.

The first example relates to the treatment of gas collected from a steel plant including a converter of 150 tons capacity, it being understood that a steel plant may contain a battery of such converters. Assuming refinement of pig iron containing 3.8 percent carbon with a total blowing time of 22 minutes, the mean output of hot gas drawn into the collector 6 in the course of blowing may be estimated at 46,500 $Nm^3/h$, or about 25,000 $Nm^3/h$ when converted into continuous output for a total refinement period of 45 minutes. In a collector device without combustion of the converter gases, the amount of carbon monoxide may reach 65 percent of the total flow collected during refining, or in the present case, about 16,000 $Nm^3/h$ of combustible gas supplied to the combustion chamber 8, these gases being stored in a suitable manner before combustion. The stoichiometric combustion of these gases in the combustion chamber requires a corresponding supply of combustion air equal to 41,000 $Nm^3/h$. At the same time, the auxiliary collections, operating 100 percent of the time, involve the following estimated flow rates:- 100,000 $Nm^3/h$ for intake round the converter and 120,000 $Nm^3/h$ for the other collectors in the steel plant, or a total of 220,000 $Nm^3/h$ of polluted air fed into collector 11. The branch 13 of the collector supplies the combustion chamber with the 41,000 $Nm^3/h$ of essentially oxidizing gas needed for the stochiometric combustion of the hot gases. Part of the sensible heat from the burned gases is transferred to a medium to be heated, by means comprising heat exchange surfaces associated with the combustion chamber. The residue of the gases from the auxiliary collectors, or 180,000 Nm³/h, is fed by the branch 14 of said collector to the cooling chamber 15 for supplementary cooling of the gases after combustion. The largely cooled gases then enter the central dust-remover 17 and are subsequently released to the atmosphere via stack 18. Assuming a duration of refining of 45 minutes from pour to pour, the production of steel corresponding to the above quantities would be 200 tons/h. It should be added that because of the cyclical operation of the refining plant, the emission of combustible gases is intermittent, and an accumulator must be provided between the hot gas collector and the combustion chamber to ensure stability of operation of said combustion chamber.

In the second example whose description follows, the dust-removal method is applied to an oxygen steel plant having a continuous refining installation consisting of two refining lines each of 100 t/h capacity, the output therefore being equivalent to that of the steel plant in the previous example. Each refining line comprises an assembly such as described in the previously metioned French Patent 1,407,082.

The non-combustion collector hood disposed above each reactor continously collects a stream of 10,500 Nm³/h containing 80 percent carbon monoxide, or about 8,500 Nm³/h of combustible gas, needing 21,000 Nm³/h of air per refining line for stochiometric combustion, supplied as in the preceding example, by part of the gas from the auxiliary collectors and in the present case, comprising 30,000 Nm³/h for collection around the two refining lines and as before 120,000 Nm³/h for the other collectors, or a total of 150,000 Nm³/h. These two refining lines continuously produce a supply of hot gas whose stochiometric combustion necessitates about 42,000 Nm³/h of air, supplied by branch 13 of the auxiliary collector. The sensible heat from the burned gases is partly transmitted to a medium requiring heating, by members comprising heat exchange surfaces associated with the combustion chamber. The remainder delivered by the branch 14 to the cooling chamber is 108,000 Nm³/h available for supplementary cooling of the gases after combustion.

Comparison of the two examples above shows that the dust-removal process to which the invention relates is particularly applicable to an oxygen steel plant including a continuous refining installation. In practice, a volume of gas is drawn which is considerably less than that drawn in with a conventional steel plant and is richer in carbon monoxide. Also, for the design of continuous refining plant referred to, the amount of gas collected around the refining plant itself is considerably less than in the case of a converter, the other amounts of gas collected by the auxiliary collectors remaining the same for a given steel production. The combustion of the hot gases in the presence of the stochiometrically corresponding amount of gas from the auxiliary collector enables a substantial residue to be available for supplementary cooling of the combustion gases. In other words, very effective thermal protection of the central dust-remover is assured, while only an amount of polluted gas much less than that involved in the previous example needs treating. Finally, stability of operation of the combustion chamber is assured because of its continuous feeding with fuel.

The method to which the present invention relates is applicable to oxygen steel plants of the conventional type, and enables the amount of polluted gas needing treatment to be reduced, while permitting the design of the entire dust-removal system to be optimized. The present method is particularly applicable to oxygen steel plants including a continuous refining installation, permitting improved utilization of the various gas flows involved, while benefitting from the reduced amounts of polluted gas to be treated, and ensuring excellent thermal protection of the central dust-remover. This leads to improved performance and a reduction of the construction and operating costs.

I claim

1. A method for treating and purifying the streams of polluted gas from an oxygen steel plant, comprising collecting the main stream of gas emitted by the refining plant without combustion, simultaneously collecting other streams of gas produced by auxiliary pollution sources in the steel plant, burning said main stream of gas in the presence of the corresponding stochiometric amount of gas originating from said auxiliary pollution sources, transferring part of the sensible heat from the burned gases to a medium needing heating, completing the cooling of the said burned gases by directly contacting them with the residue of the gases originating from said auxiliary sources, subjecting said residue and said cooled gases to a dust-removal treatment and then discharging the resultant cooled gases into the atmosphere.

2. The method of claim 1 further comprising subjecting said mainstream of gas emitted by the refining plant to a wet dust-removal process for removing the larger particles therefrom prior to burning thereof.

3. The method of claim 1 wherein said collecting of the mainstream of gas without combustion comprises limiting air inputs to the refining plant to a very low value whereby said mainstream of gas is rich in carbon monoxide content.

4. Apparatus for the treatment and purification of polluted gas from an oxygen steel plant and for transferring part of the sensible heat from the treatment process to a medium requiring heating including means for collecting, without combustion, a main gas stream emitted by said steel plant, and collecting means for collecting secondary gas streams produced by auxiliary pollution sources in said said steel plant; said apparatus comprising a combustion chamber having fuel feeding means comprised of the collecting means for the main gas stream, said collecting means for collecting secondary gas streams having first and second branches, combustion gas feeding means connected to said combustion chamber and comprising said first branch of said secondary gas stream collecting means, means for transferring part of the sensible heat of the gases burned in said combustion chamber to said medium requiring heating, a cooling chamber connected to said second branch and to said combustion chamber for receiving the burned gases emitted from the combustion chamber, a dust-remover connected to receive cooled gases from said cooling chamber, and means for discharging gases from said dust-remover into the atmosphere.

5. An apparatus for the treatment and purification of polluted gas from an oxygen steel plant according to claim 4, wherein the collecting means for collecting secondary gas streams produced by auxiliary pollution sources in said steel plant comprises first and second gas collecting devices, the first collection device being connected to said first branch and the second collection device being connected to said second branch, and wherein the gas from said second branch is used in said cooling chamber to cool the burned gas from said combustion chamber.

6. The apparatus of claim 5 further comprising particle remover means connected to remove larger particles from the mainstream of gas before application thereof to said combustion chamber.

7. The apparatus of claim 6 wherein said particle removing means comprises a wet dust-removal device.

8. The apparatus of claim 5 wherein said dust-remover comprises an electrostatic dust-remover.

* * * * *